UNITED STATES PATENT OFFICE.

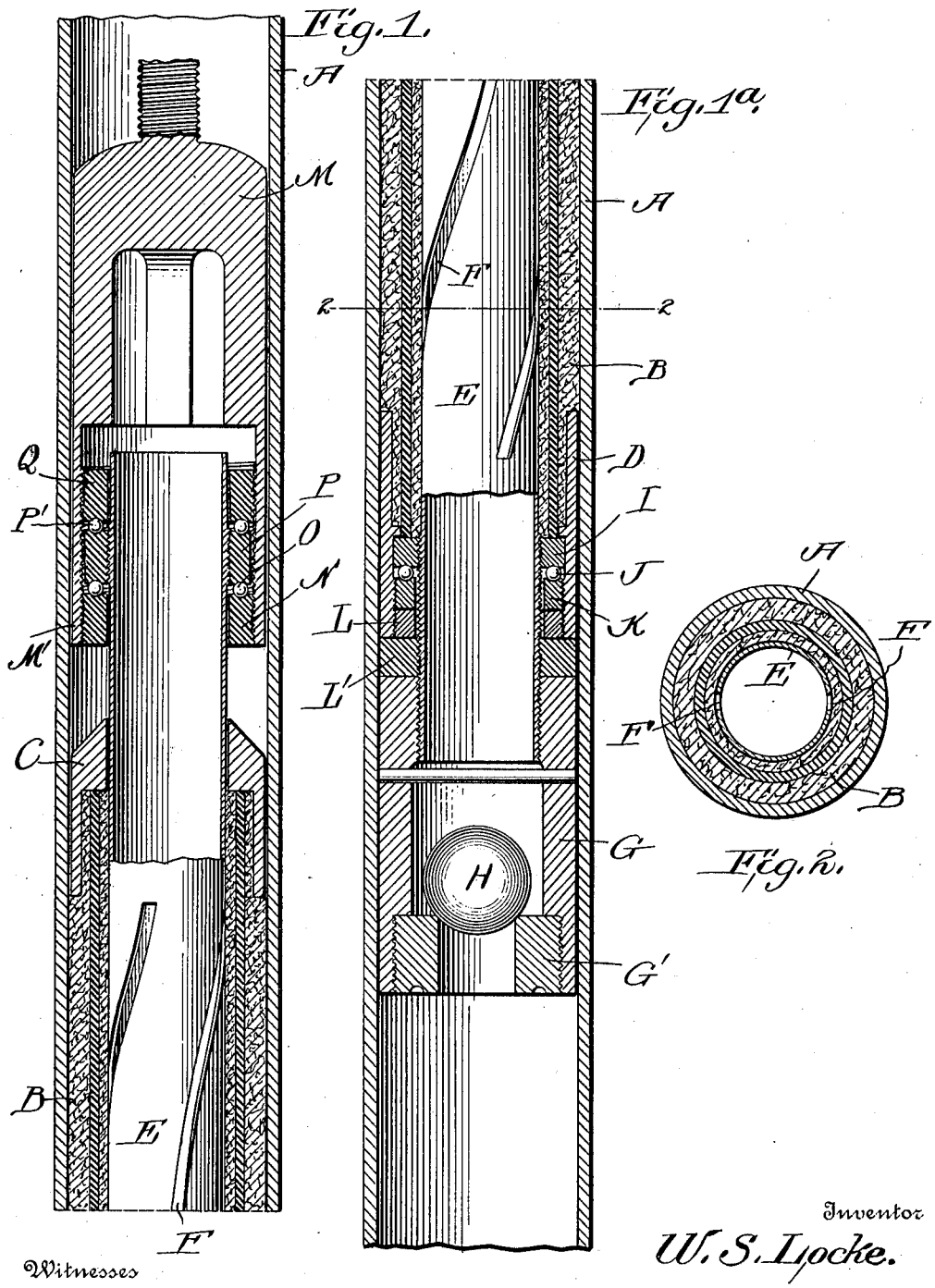

WILLIAM S. LOCKE, OF LOS ANGELES, CALIFORNIA.

PLUNGER.

1,026,873.      Specification of Letters Patent.      Patented May 21, 1912.

Application filed February 28, 1911. Serial No. 611,416.

*To all whom it may concern:*

Be it known that I, WILLIAM S. LOCKE, a citizen of the United States, residing at Los Angeles, in the county of Los Angeles and State of California, have invented a new and useful Improvement in Plungers, of which the following is a specification.

This invention relates to certain new and useful improvements in pumps and especially oil pumps, the object being to permit relative rotation of the plunger tube with respect to the gasket and to secure such rotation automatically by producing spirally extending slots in the plunger tube thereby causing a slight rotation of said tube when forced downwardly into the oil, as will hereafter be explained. The object of said rotation being to prevent continuous expansion of the gasket by oil pressure through the slots at the same points continuously, and also to dislodge sand or sediment which would work through slots or perforations in the plunger tube and which would accumulate in said slots or perforations if there was no relative movement between the plunger tube and the gasket.

With this object in view, the invention consists in the novel features of construction hereinafter described pointed out in the claims and shown in the accompanying drawings, in which, Figure 1 is a vertical section through the upper portion of a plunger, the outer casing of the pump being also shown in section. Fig. 1ª is a similar section through the lower portion of the plunger. Fig. 2 is a transverse section on the line 2—2 of Fig. 1ª.

Referring to the drawings, A designates the outer casing or barrel of the pump within which works a plunger comprising a fabric gasket B and a plunger tube E. A metal ferrule D is vulcanized upon the lower end of the gasket. The plunger tube E is rotatable within the gasket and is provided with spirally extending slots F, through which the pressure of the liquid can act upon the gasket and by expanding the same hold the plunger in close frictional contact with the inner walls of the barrel A. A suitable ferrule C is secured to the upper end of the gasket. The plunger tube E is provided with the usual cage G at its lower end having a valve seat G' with which a ball valve H coöperates. Upon the lower portion of the plunger tube I also place ball cups I and K, the cup I being threaded upon the plunger tube and the cup K, which is the lower one, being loose upon the plunger tube and resting upon a nut L threaded into the ferrule D. A suitable jam nut L' is also threaded upon the plunger tube E and serves to hold the valve cage G in place. Between the cups I and K are placed suitable balls J.

At the upper end of the plunger is a cage M adapted to be connected in the usual manner to an operating rod, not shown, and said cage is provided with a depending sleeve M' into which the upper end of the plunger tube extends and in said sleeve are arranged ball cups N, P, and Q. The ball cups Q and N are threaded to the sleeve M' and the ball cup P is threaded upon the plunger tube. Between the cups N and P are arranged balls O and between the cups P and Q are arranged balls P'. The two sets of balls are necessary at the upper end as the last mentioned set only come into play upon downward movement of the plunger. This construction allows the plunger tube with its depending valve cage to rotate relative to the gasket.

It will be understood that pressure of the weight of the fluid through the slots upon the gasket will press the same outwardly against the sides of the working barrel, thereby making a tight fit and preventing passage of any fluid between the working barrel and the gasket. This outward pressure through the slots upon the gasket also serves to prevent any relative rotation between the gasket and the working barrel. As the plunger is driven mechanically downward through the oil the oil is forced into the said spiral slots and by reason of its viscosity and fluid friction causes slight rotation of the plunger tube, thereby bringing successively new surfaces of the gasket upon which said oil pressure is brought to bear, thereby insuring uniform wear upon the gasket.

Having thus fully described my invention, what I claim as new and desire to secure by Letters Patent is:—

1. In an oil pump, a plunger tube provided with spiral slots, said plunger tube being rotatable and adapted for rotation through action of the oil upon said slots.

2. In an oil pump, a casing, a gasket held therein against rotation, and a rotatable plunger tube working through said gasket, said plunger tube being provided with spiral slots and adapted for rotation by action of the oil upon said slots.

3. In an oil pump, a casing, a gasket secured therein, a rotatable plunger tube working through said gasket, said plunger tube having spiral slots, sets of ball cups arranged at the upper and lower end portions of the plunger tube, one cup of each set being secured to the plunger tube, and the others loose upon the plunger tube, and balls arranged between the cups of each set.

WILLIAM S. LOCKE.

Witnesses:
J. O. DOWNING,
D. D. PEFFLY.